United States Patent
Rajarathinam et al.

(10) Patent No.: US 10,361,997 B2
(45) Date of Patent: Jul. 23, 2019

(54) AUTO DISCOVERY BETWEEN PROXIES IN AN IPV6 NETWORK

(71) Applicant: Riverbed Technology, Inc., San Francisco, CA (US)

(72) Inventors: Ponpandiaraj Rajarathinam, Bangalore (IN); Rajeev Kumar, Bangalore (IN); Dinesh A. Gandhewar, Bangalore (IN); Ananth Arumugam R, Bangalore (IN)

(73) Assignee: Riverbed Technology, Inc., San Francisco, CA (US)

( * ) Notice: Subject to any disclaimer, the term of this patent is extended or adjusted under 35 U.S.C. 154(b) by 4 days.

(21) Appl. No.: 15/858,836

(22) Filed: Dec. 29, 2017

(65) Prior Publication Data

US 2018/0191673 A1 Jul. 5, 2018

Related U.S. Application Data

(60) Provisional application No. 62/440,158, filed on Dec. 29, 2016.

(51) Int. Cl.
*H04L 12/28* (2006.01)
*H04L 29/12* (2006.01)
(Continued)

(52) U.S. Cl.
CPC .......... *H04L 61/6059* (2013.01); *H04L 67/28* (2013.01); *H04L 67/42* (2013.01);
(Continued)

(58) Field of Classification Search
CPC ..... H04L 61/6059; H04L 67/28; H04L 67/42; H04L 69/16; H04L 69/32; H04W 4/20
(Continued)

(56) References Cited

U.S. PATENT DOCUMENTS

| 5,371,852 A | 12/1994 | Altanasio et al. |
| 5,737,594 A | 4/1998 | Williams |

(Continued)

FOREIGN PATENT DOCUMENTS

| JP | 2002359649 | 12/2002 |
| JP | 2004254039 | 9/2004 |

(Continued)

OTHER PUBLICATIONS

Peribit Networks Inc. "Unleashing the True Power of Today's Networks" A Peribit White Paper, Aug. 2002, pp. 1-13, URL=http://www.peribit.com/products/etc/0217w02punl.htm.
(Continued)

*Primary Examiner* — Thai D Hoang
(74) *Attorney, Agent, or Firm* — Park, Vaughan, Fleming & Dowler LLP; Laxman Sahasrabuddhe

(57) ABSTRACT

Systems and techniques are described for performing proxy auto-discovery in an Internet Protocol version 6 (IPv6) network by using the destination options extension header field in the IPv6 header. Specifically, systems and techniques are described to enable a pair of proxies to transparently intercept connection handshake messages that are carried in IPv6 packets between two network nodes, and to use the destination options extension header field in the IPv6 packets to automatically discover each other.

16 Claims, 5 Drawing Sheets

(51) Int. Cl.
*H04L 29/08* (2006.01)
*H04W 4/20* (2018.01)
*H04L 29/06* (2006.01)

(52) U.S. Cl.
CPC .............. *H04L 69/16* (2013.01); *H04L 69/32* (2013.01); *H04W 4/20* (2013.01)

(58) Field of Classification Search
USPC .................................. 370/392–393, 465–467
See application file for complete search history.

(56) References Cited

U.S. PATENT DOCUMENTS

| | | | |
|---|---|---|---|
| 5,754,774 A | 5/1998 | Bittinger et al. | |
| 5,822,746 A | 10/1998 | Williams | |
| 5,941,988 A | 8/1999 | Bhagwat et al. | |
| 5,990,810 A | 11/1999 | Williams | |
| 6,104,717 A | 8/2000 | Coile et al. | |
| 6,138,162 A | 10/2000 | Pistriotto et al. | |
| 6,163,811 A | 12/2000 | Porter | |
| 6,178,461 B1 | 1/2001 | Chan et al. | |
| 6,195,366 B1 | 2/2001 | Kayashima et al. | |
| 6,237,049 B1 | 5/2001 | Ludtke | |
| 6,311,216 B1 | 10/2001 | Smith et al. | |
| 6,347,342 B1 | 2/2002 | Marcos et al. | |
| 6,351,773 B1 | 2/2002 | Fijolek et al. | |
| 6,397,253 B1 | 5/2002 | Quinlan et al. | |
| 6,415,323 B1 | 7/2002 | McCanne et al. | |
| 6,415,329 B1 | 7/2002 | Gelman et al. | |
| 6,449,658 B1 | 9/2002 | Lafe et al. | |
| 6,473,408 B1 | 10/2002 | Colle et al. | |
| 6,487,538 B1 | 11/2002 | Gupta et al. | |
| 6,507,564 B1 | 1/2003 | Merchant | |
| 6,510,469 B1 | 1/2003 | Starnes et al. | |
| 6,542,964 B1 | 4/2003 | Scharber | |
| 6,553,141 B1 | 4/2003 | Huffman | |
| 6,571,277 B1 | 5/2003 | Daniels-Barnes et al. | |
| 6,574,716 B2 | 6/2003 | Dovi | |
| 6,598,081 B1 | 7/2003 | Colle et al. | |
| 6,642,860 B2 | 11/2003 | Meulenbroeks | |
| 6,667,700 B1 | 12/2003 | McCanne et al. | |
| 6,678,828 B1 | 1/2004 | Pham et al. | |
| 6,704,730 B2 | 3/2004 | Moulton et al. | |
| 6,721,780 B1 | 4/2004 | Kasriel et al. | |
| 6,751,677 B1 | 6/2004 | Ilnicki et al. | |
| 6,757,733 B2 | 6/2004 | Gupta | |
| 6,772,193 B1 | 8/2004 | Igawa et al. | |
| 6,775,244 B1 | 8/2004 | Hattig | |
| 6,822,955 B1 | 11/2004 | Brothers et al. | |
| 6,845,393 B1 | 1/2005 | Murphy et al. | |
| 6,874,017 B1 | 3/2005 | Inoue et al. | |
| 6,892,235 B1 | 5/2005 | Daude et al. | |
| 6,894,981 B1 | 5/2005 | Colle et al. | |
| 6,910,068 B2 | 6/2005 | Zintel et al. | |
| 6,940,835 B2 | 9/2005 | Reza et al. | |
| 6,947,444 B2 | 9/2005 | Heller | |
| 6,973,485 B2 | 12/2005 | Ebata et al. | |
| 6,981,029 B1 | 12/2005 | Menditto et al. | |
| 6,996,841 B2 | 2/2006 | Kadyk et al. | |
| 7,010,762 B2 | 3/2006 | O'Neil | |
| 7,047,485 B1 | 5/2006 | Klein et al. | |
| 7,092,943 B2 | 8/2006 | Roese et al. | |
| 7,096,266 B2 | 8/2006 | Lewin et al. | |
| 7,123,599 B2 | 10/2006 | Yano et al. | |
| 7,123,613 B1 | 10/2006 | Chawla et al. | |
| 7,139,976 B2 | 11/2006 | Kausik et al. | |
| 7,159,014 B2 | 1/2007 | Kausik et al. | |
| 7,161,947 B1 | 1/2007 | Desai | |
| 7,162,529 B2 | 1/2007 | Morishige et al. | |
| 7,209,977 B2 | 4/2007 | Acharya et al. | |
| 7,219,154 B2 | 5/2007 | Blakley et al. | |
| 7,225,264 B2 | 5/2007 | Croman et al. | |
| 7,231,658 B2 | 6/2007 | Kunito et al. | |
| 7,310,687 B2 | 12/2007 | Psounis et al. | |
| 7,316,028 B2 | 1/2008 | Dontatelli et al. | |
| 7,318,100 B2 | 1/2008 | Demmer et al. | |
| 7,363,363 B2 | 4/2008 | Del Canto et al. | |
| 7,328,260 B1 | 5/2008 | Muthiyan et al. | |
| 7,404,008 B2 * | 7/2008 | Takeuchi .......... | H04L 29/12066 370/392 |
| 7,512,689 B2 | 3/2009 | Saint Haillaire | |
| 7,565,407 B1 | 7/2009 | Hayball | |
| 7,577,729 B1 | 8/2009 | Umbehocker et al. | |
| 7,610,393 B1 | 10/2009 | Chen et al. | |
| 7,641,562 B2 | 1/2010 | Nakamura | |
| 7,650,416 B2 | 1/2010 | Wu et al. | |
| 7,685,287 B2 | 3/2010 | Moutafov | |
| 7,701,956 B2 | 4/2010 | Howe | |
| 7,769,858 B2 | 8/2010 | Corl, Jr. et al. | |
| 7,774,495 B2 | 8/2010 | Pabla et al. | |
| 7,779,093 B1 | 8/2010 | Zhang et al. | |
| 7,948,921 B1 | 5/2011 | Hughes et al. | |
| 7,984,160 B2 | 7/2011 | Lam | |
| 8,069,225 B2 | 11/2011 | McCanne et al. | |
| 8,180,902 B1 | 5/2012 | Day et al. | |
| 8,819,275 B2 * | 8/2014 | Liu ................... | H04L 67/1027 709/238 |
| 9,172,620 B2 | 10/2015 | Demmer et al. | |
| 9,553,899 B2 * | 1/2017 | Liu ................... | H04L 67/1027 |
| 9,826,068 B2 * | 11/2017 | Liu ................... | H04L 67/1027 |
| 2001/0051927 A1 | 12/2001 | London et al. | |
| 2002/0038371 A1 | 3/2002 | Spacey | |
| 2002/0062384 A1 | 5/2002 | Tso | |
| 2002/0133582 A1 * | 9/2002 | Shibata ............. | H04L 29/12009 709/223 |
| 2002/0161904 A1 | 10/2002 | Tredoux et al. | |
| 2003/0055826 A1 | 3/2003 | Graham | |
| 2003/0174648 A1 | 9/2003 | Wang et al. | |
| 2004/0003058 A1 | 1/2004 | Trossen | |
| 2005/0102427 A1 * | 5/2005 | Yokota ............... | H04L 67/1002 709/245 |
| 2005/0107102 A1 | 5/2005 | Yoon et al. | |
| 2005/0165885 A1 | 7/2005 | Wong | |
| 2006/0023721 A1 | 2/2006 | Miyake et al. | |
| 2006/0123477 A1 | 6/2006 | Raghavan et al. | |
| 2007/0038853 A1 | 2/2007 | Day et al. | |
| 2007/0233857 A1 | 10/2007 | Cheng et al. | |
| 2008/0205315 A1 | 8/2008 | Park et al. | |
| 2008/0320151 A1 | 12/2008 | McCanne et al. | |
| 2008/0320154 A1 | 12/2008 | Demmer et al. | |
| 2009/0157866 A1 | 6/2009 | Sridharan et al. | |
| 2009/0157888 A1 | 6/2009 | Demmer et al. | |
| 2010/0228867 A1 | 9/2010 | Lam | |
| 2010/0318665 A1 | 12/2010 | Demmer et al. | |
| 2015/0373135 A1 * | 12/2015 | McKeown ......... | H04L 69/24 709/202 |

FOREIGN PATENT DOCUMENTS

| | | |
|---|---|---|
| WO | 19950020793 | 8/1995 |
| WO | 20000013110 | 3/2000 |
| WO | 20010080022 | 10/2001 |
| WO | 20020054699 | 7/2002 |

OTHER PUBLICATIONS

Amer et al. "File Access Prediction with Adjustable Accuracy", Conf. Proc. of 2002 IEEE Int., Performance Computing, and Communications, 21:131-140 conference held Apr. 3, 2002-May 5, 2002, Phoenix, Arizona.

Caceres et al., "Web Proxy Caching: The Devil is in the Details", Proceedings of the Workshop on Internet Server Performance, Jun. 1998, pp. 111-118 Scientific Literature Digital Library Madison Wisconsin, USA.

Deshpande et al. "Selective Markov Models for Predicting Web-Page Accesses," ACM Transactions on Internet Techonology, 2004 pp. 163-184, vol. 4, Issue 2.

Factor et al., "Compression in the Presence of Shared Data," International Journal of Computing and Information Sciences, Jun. 2001, pp. 29-41, vol. 135, Issue 1-2.

Fan et al., "Summary Cache: A Scalable Wide Area Web Cache

(56) References Cited

OTHER PUBLICATIONS

Sharing Protocol," Proceedings of the IEEE/ACM Transactions of Networking, Jun. 2000, vol. 8, No. 3, pp. 281-293.
Feldmeier et al., "Protocol Boosters," IEEE JSAC, Apr. 1998, pp. 437-444, vol. 16, Issue 3.
Griffoen et al., "Automatic Prefetching in a WAN,", Proceedings of the IEEE Workshop on Advances in Parallel and Distributing Systems, Oct. 1993, Technical Report #CS243-93, pp. 8-12.
Griffoen et al., "Reduing File System Latency Using a Predictive Approach," Proceedings of the USENIX Summer 1994 Technical Conference on USENIX, Jun. 1994, vol. 1.
Housel et al., "Emulator Express: A System for Optimizing Emulator Performance for Wireless Networks," IBM Systems Journal, 2000 pp. 384-402, vol. 39, Issue 2.
Kahol et al., "A Strategy to Manage Cache Consistency in a Disconnected Distributed Network," IEE Transactions on Parallel and Distributed Systems, Jul. 2001, pp. 686-700, vol. 12, Issue 7, IEEE Computer Society, Los Alamitos, CA USA.
Knutsson, Bjorn et al., "Transparent Proxy Signalling," Journal of Communication Networks, Mar. 1999, pp. 1-11.
Lei, et al., "An Analytical Approach to File Prefetching," Proceedings of the Annual Conference on USENIX Annual Technical Conference, Jan. 1997, pp. 1-12, Anaheim CA, USA.
Mellia, M., "TCP Smart-Framing: Using Smart Segements to Enhance the Peformance of TCP," Global Telecommunications Conference, 2001, Globecom '01, IEEE vol. 3, Nos. 25-29, Nov. 2001.
Muthitacharoen et al., "A Low-Bandwidth Network File System," Proceedings of the 18th ACM Symposium on Operating System Pricinples (SOSP'01) Oct. 21-24, 2001, pp. 174-187.
Oly, James et al., "Markov Model Prediction of I/O Requests for Scientific Applications," Jun. 2002, Proceedings of the 16th International Conference on Supercomputing, pp. 147-155.
Padmanabhan et al., "Using Predictive Prefetching to Improve World Wide Web Latency," IEEE Transactions on Antennas and Propagation, 26(3): 22-36(1996).
Rhea et al., "Value-Based Web Caching," Proceedings of the 12th International Conference on World Wide Web, Budapest, Hungary, May 2003, pp. 619-628, ACM, New York, New York, USA.
Spring et al., "A Protocol-Independent Technique for Eliminating Redundant Network Traffic," Proceedings of ACM SIGCOMM, Computer Communication Review, Oct. 2000, pp. 87-95, vol. 30, Issue 4.
Tolia et al., "An Architecture for Internet Data Transfer," Third Symposium on Networked Systems Design and Implementation (NSDI'06), May 2006, San Jose, California, USA.
Yang et al. "Mining Web Logs for Prediction Models in WWW Caching and Prefetching," Aug. 2001, Proceedings of the Seventh ACM SIGKDD International Conference on Knowledge Discovery and Data Mining, KDD'01, San Francisco, CA pp. 473-478.
Knutsson et al.; "Transparent Proxy Signaling", pp. 1-11, 1229-2370/99, 1999 KICS.
Rodriguez et al.; "TPOT: Translucent Proxying of TCP", Computer Communications, V. 24, No. 2, Feb. 2001.

* cited by examiner

AUTO DISCOVERY BETWEEN PROXIES IN AN IPV6 NETWORK

RELATED APPLICATION

This application claims benefit of U.S. Provisional Patent Application No. 62/440,158, filed 29 Dec. 2016, the contents of which are herein incorporated by reference in their entirety for all purposes. This application is also related to (1) U.S. Pat. No. 9,172,620, entitled "Cooperative proxy auto-discovery and connection interception," the contents of which are herein incorporated by reference in their entirety for all purposes, and (2) U.S. Pat. No. 8,180,902, entitled "Establishing network connections between transparent network devices," the contents of which are herein incorporated by reference in its entirety for all purposes.

BACKGROUND

The present disclosure relates to data communication networks. More specifically, the present disclosure relates to auto-discovery between proxy devices in an Internet Protocol version 6 (IPv6) network. A proxy device (also referred to as a "proxy" for short) is a device that functions as a performance-enhancing intermediary between a source node and a destination node. Without loss of generality, we will assume that the source node is a client computer, and the destination node is a server computer. Each proxy may forward, modify, or otherwise transform client-server communications. Examples of proxies include, but are not limited to, (1) web proxies that enhance performance through caching or enhance security by controlling access to servers, (2) mail relays that forward mail from a client to another mail server, (3) DNS relays that cache DNS name resolutions, (4) wide-area network (WAN) accelerators that compress network traffic over a WAN that connects two sites (e.g., a data center and a regional office), and so forth.

One problem that must be overcome when deploying proxies is that of directing client requests to the proxy instead of to the destination server. However, this requires explicit configuration of clients. One way around this problem is to deploy a transparent proxy. The presence of the transparent proxy is not made explicitly known to the client or servers, so all client requests proceed along the network path towards the server as they would have if there were no transparent proxy. This might be done by placing the transparent proxy host in the network path between the client and the server.

Some benefits of a transparent proxy require that a proxy pair exist in the network path. For example, if a proxy is used to transform data in some way, a second proxy preferably untransforms the data. For example, where traffic between a client and a server is to be compressed or encrypted for transport over a portion of the network path between the client and the server, a proxy on one side of that portion would compress or encrypt data before it flows over that portion and a proxy on the other side of that portion would uncompress or decrypt the data and send it along the network path, thereby providing for transparent transformation of data flowing between the client and the server.

For actions that require a proxy pair, preferably both proxies in the proxy pair do not perform a transformation unless they can be assured of the existence and operation of the other proxy in the proxy pair. Where each proxy must be explicitly configured with indications of the pairs to which it belongs and to the identity of the other members of those pairs, the administrative burden on a network administrator might well make some operations infeasible if they require proxy pairs. Even where a proxy is interposed in a network and gets all of the traffic from a client or server, it still must discover the other member for each proxy pair the proxy needs, if the proxy is to perform actions that require proxy pairs.

A technique described in U.S. Pat. No. 9,172,620 (and also U.S. Pat. No. 8,180,902) uses the Transmission Control Protocol (TCP) options portion to perform proxy auto-discovery. Unfortunately, the TCP options portion is limited to 40 bytes, and it may not be feasible to use the TCP options portion to perform proxy auto-discovery in an IPv6 network because each IPv6 address is 16 bytes long.

SUMMARY

Some embodiments described herein provide techniques and systems for performing proxy auto-discovery in an IPv6 network. During operation, a first proxy device (e.g., a client-side proxy device) can intercept a first IPv6 packet that is sent from a source node to a destination node, wherein the first IPv6 packet includes a TCP connection request. Next, the first proxy device can add a first destination options extension header (DOEH) to the first IPv6 packet, wherein the first DOEH is placed between a fixed header of the first IPv6 packet and a TCP header of the TCP connection request, and wherein the first DOEH includes at least an IPv6 address of the first proxy device. Note that, when the first DOEH is added to the first IPv6 packet, the first proxy device can set a Next Header field in the fixed header of the first IPv6 packet to a first value that indicates that the first DOEH follows the fixed header. Also note that the Next Header field in the first DOEH stores a second value that indicates that a TCP header follows the first DOEH. Next, the first proxy device can forward the first IPv6 packet toward the destination node, monitor IPv6 packets that are sent from the destination node to the source node.

A second proxy device (e.g., a server-side proxy device) can then intercept the first IPv6 packet. Next, responsive to detecting that the first IPv6 packet includes the first DOEH, the second proxy device can extract at least an IPv6 address of the first proxy device from the first DOEH. The second proxy device can then add a second entry in a second proxy mapping table that associates an IPv6 address of the source node with the IPv6 address of the first proxy device. Next, the second proxy device can forward the first IPv6 packet toward the destination node, and monitor IPv6 packets that are sent from the destination node to the source node.

Next, the second proxy device can intercept a second IPv6 packet that is sent from the destination node to the source node, wherein the second IPv6 packet includes the acknowledgment of the TCP connection request. The second proxy device can then add a second DOEH to the second IPv6 packet, wherein the second DOEH is placed between a fixed header of the second IPv6 packet and a TCP header of the acknowledgment of the TCP connection request, and wherein the second DOEH includes at least an IPv6 address of the second proxy device. When the second DOEH is added to the second IPv6 packet, the second proxy device can set a Next Header field in the fixed header of the second IPv6 packet to the first value that indicates that the second DOEH follows the fixed header. Note that the Next Header field in the second DOEH stores the second value that indicates that a TCP header follows the second DOEH. Next, the second proxy device can forward the second IPv6 packet toward the source node.

The first proxy device can intercept the second IPv6 packet that is sent from the destination node to the source node (as explained above, the second proxy device intercepted and added the second DOEH to the second IPv6 packet), wherein the second IPv6 packet includes an acknowledgment of the TCP connection request. Responsive to detecting that the second IPv6 packet includes the second DOEH, the first proxy device can then extract at least an IPv6 address of a second proxy device from the second DOEH. Next, the first proxy device can add a first entry in a first proxy mapping table that associates an IPv6 address of the destination node with the IPv6 address of the second proxy device. The first proxy device can then remove the second DOEH from the second IPv6 packet, and forward the second IPv6 packet toward the source node.

DETAILED DESCRIPTION

Figure 1:
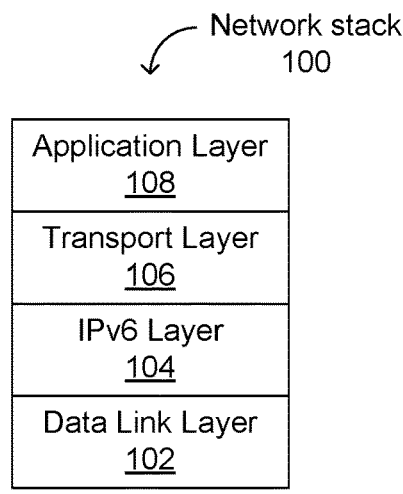
FIG. 1 illustrates an example of a network stack in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices for sending, receiving, directing, and optimizing network data traffic.

Communication between two nodes in a network is typically accomplished using a layered software architecture, which is often referred to as a networking software stack or simply a networking stack. As is true of any data processing function, a given functionality in a networking stack can be implemented using hardware or software or a combination thereof. The decision to implement a specific functionality in hardware or software is typically based on a tradeoff between performance and cost.

Each layer is usually associated with one or more protocols which define the rules and conventions for processing packets in that layer. Each lower layer performs a service for the layer immediately above it to help with processing packets, and each layer typically adds a header (control data) that allows peer layers to communicate with one another. At the sender, this process of adding layer-specific headers is usually performed at each layer as the payload moves from higher layers to lower layers. The receiving host generally performs the reverse process by processing headers of each layer as the payload moves from the lowest layer to the highest layer.

A data link layer (or link layer for short) can be defined as a layer that manages a communication channel between adjacent communication devices. For example, if two routers are connected to each other via a cable, then the link layer would typically manage the communication channel between these two routers. The Ethernet layer is an example of a link layer. A network layer can be defined as a layer that enables communication between any two devices across a network of devices. For example, the IPv6 layer is an example of a network layer that enables communication between two routers in an IPv6 network. A transport layer delivers packets between a source and destination, and can retransmit packets if they are lost, and ensure that packets are delivered in a particular order. TCP is an example of a transport layer protocol. The application layer comprises software applications that use the network to communicate with other applications executing at other network nodes. The Hypertext Transfer Protocol (HTTP) is an example of an application layer protocol.

FIG. 1 illustrates an example of a network stack in accordance with some embodiments described herein. Network stack 100 can include data link layer 102, IPv6 layer 104, transport layer 106, and application layer 108. In some embodiments, the auto-discovery techniques disclosed herein can be implemented by modifying the software code for IPv6 layer 104. In other words, in these embodiments, the modified software code for IPv6 layer can perform all the usual functions of the IPv6 protocol, and additionally perform auto-discovery functions. In other embodiments, the auto-discovery functionality can be implemented in an interception layer or intercept module (not shown in FIG. 1) that is inserted between IPv6 layer 104 and data link layer 102. The implementation shown in FIG. 1 is for illustration purposes only and is not intended to limit the scope of this disclosure.

Figure 2:
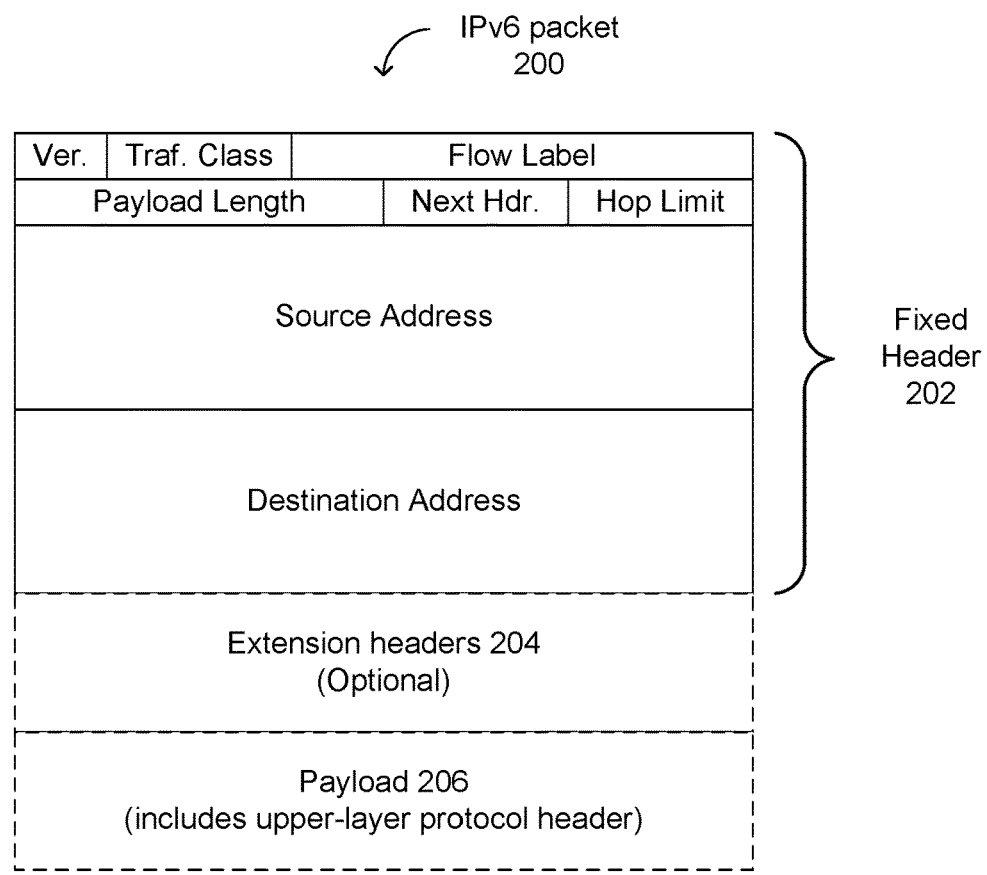
FIG. 2 illustrates an IPv6 packet in accordance with some embodiments described herein.

FIG. 2 illustrates an IPv6 packet in accordance with some embodiments described herein. IPv6 packet 200 includes three sections, and each section can include a plurality of fields. Fixed header 202 is present in all IPv6 packets. An IPv6 packet may also contain one or more extension headers 204. Finally, payload 206 contains the data that is being carried by the IPv6 packet. If the IPv6 packet is carrying data for an upper-layer protocol, then payload 206 includes the upper-layer protocol header, e.g., the TCP header.

The Version field (labeled "Ver." in FIG. 2) is 4 bits long. The Traffic Class field (labeled "Traf. Class" in FIG. 2) is 8 bits long, and includes data to classify packets and to provide congestion control information. The Flow Label field is 20 bits long and can be used to ensure that packets in a given flow are not reordered. The Payload Length field is 16 bits long and stores the size of the payload in octets. The Next Header field is 8 bits long and specifies the type of the next header. When an extension header follows the fixed header 202, the "Next Header" field specifies which extension header follows. When an upper-layer protocol data follows the fixed header 202, the "Next Header" field specifies the upper layer protocol. The Hop Limit field is 8 bits long and is decremented by one at each intermediate node visited by the packet, and the packet is discarded when this counter reaches 0. The Source Address field is 128 bits long and contains the IPv6 address of the source node, i.e., the node that sent the IPv6 packet. The Destination address field is 128 bits long and contains the IPv6 address of the destination node, i.e., the node to which the IPv6 packet has been sent.

Fixed header 202 may be followed by one or more extension headers 204. Each extension header includes three fields: (1) a Next Header field that is 8 bits long, and that specifies the type of the next header (either another extension header or an upper-layer protocol), (2) an Extension Header Length field that is 8 bits long, and that specifies the length of this extension header in octets, and (3) one or more options that are coded using type-length-value format. Extension headers 204 may be followed by payload 206, which includes the data that the IPv6 packet is carrying. Note that payload 206 can include the upper-layer protocol header, e.g., the TCP header. Further details of the IPv6 packet format can be found in S. Deering and R. Hinden, "Internet Protocol, Version 6 (IPv6)," Internet Engineering Task Force (IETF) Request for Comments (RFC) 2460, December 1998.

Figure 3:
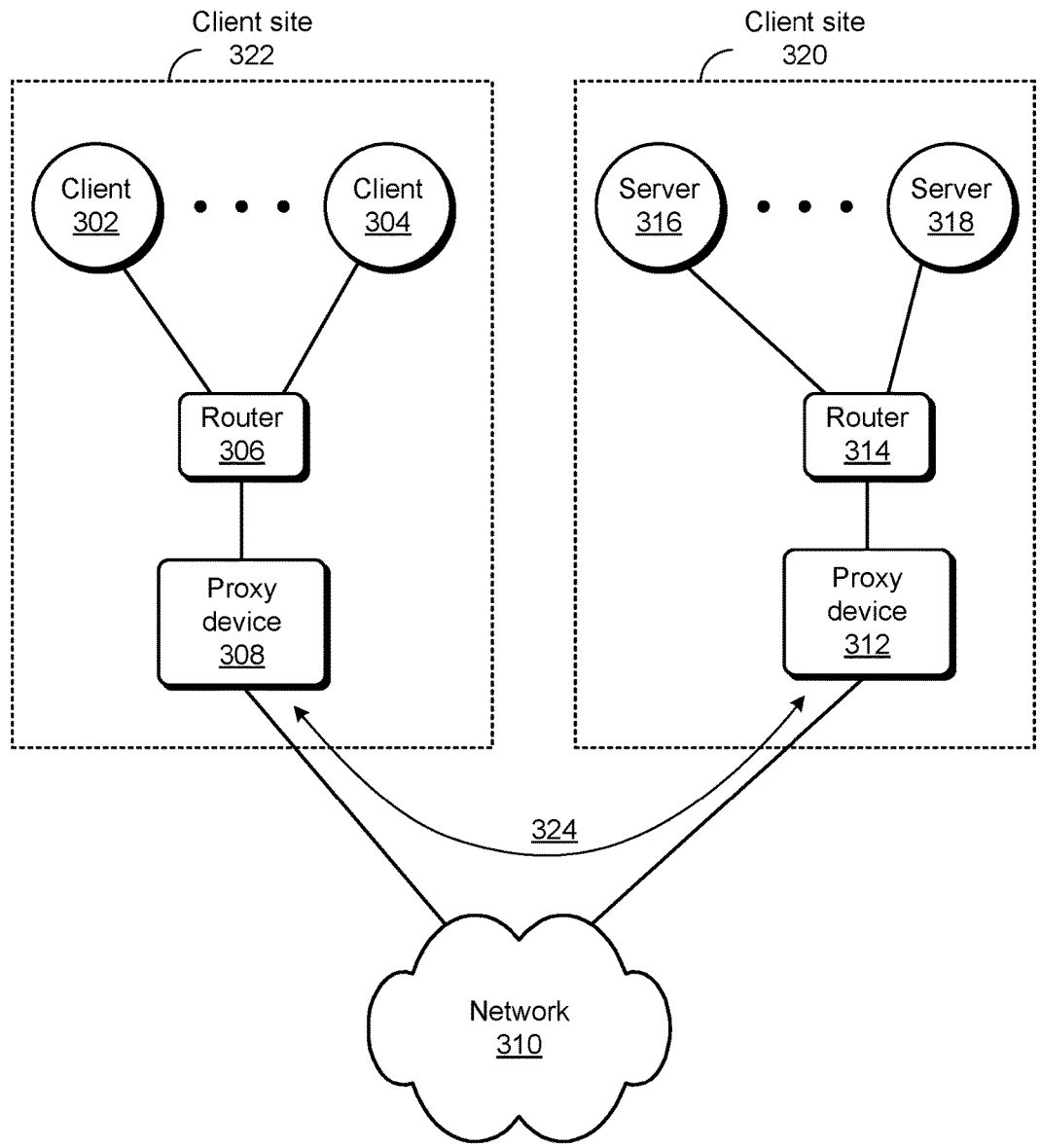
FIG. 3 illustrates a network in accordance with some embodiments described herein.

FIG. 3 illustrates a network in accordance with some embodiments described herein. The number and types of devices shown in FIG. 3 are for illustration purposes only and are not intended to limit the scope of this disclosure. For example, in some embodiments, a client site (e.g., client sites 320 and 322) may include one or more load balancers, one or more switches, one or more caching devices, etc. Although some of the examples described in this disclosure are in the context of a WAN, the disclosed systems and techniques can generally be used to improve performance of any type of network.

In the example illustrated in FIG. 3, client site 322 can be a company's headquarters or a company's regional office. Client site 322 can include one or more clients, e.g., clients 302, 304, etc., router 306, and proxy device 308. Client site 320 can host servers and data storage systems for the company's enterprise network. Client site 320 can include one or more servers, e.g., servers 316, 318, etc., router 314, and proxy device 312.

Proxy devices 308 and 312 can discover each other by performing an auto-discovery process disclosed herein. Once proxy devices 308 and 312 discover each other, they can optimize traffic between client sites 320 and 322. For example, proxy device 308 can establish connection 324 with proxy device 312, and can use connection 324 to optimize network traffic between client site 322 and client site 320. The proxy device that communicates with the client (e.g., proxy device 308 that communicates with clients 302, 304, etc.) is called the client proxy (CP). The proxy device that communicates with the server (e.g., proxy device 312 that communicates with servers 316, 318, etc.) is called the server proxy (SP).

A proxy device can maintain a proxy mapping table (PMT). When a proxy device makes additional network connections to other hosts or other proxy devices, it may consult the PMT, which maps server addresses to one or more nearby proxy addresses. This allows the proxy device to determine the server-side proxy device to communicate with for the client-server session that it processes. The auto-discovery processes described in this disclosure can be used to automatically populate the PMT.

In some embodiments, the CP constructs a probe query packet by attaching a probe query option to the connection request packet. This allows optional messages to be piggy-backed on an existing packet. The CP may store some state in the PMT indicating that a probe has already been sent for the given server. After appending the option code, the probe query packet is forwarded along the network path towards the server by the normal network delivery process. If an SP exists along this path, it detects the presence of a probe query option in the packet.

One advantage to this approach is that if there is no SP on the path between the CP and the server, the modified connection request packet (i.e., the original packet with the appended probe query option) is received by the server host. According to the network and transport protocol specifications, unrecognized options are ignored by participating hosts. Thus, when a server receives a modified connection request from a client, the probe query option is ignored and a connection response packet is sent to the client, establishing a network session with the client exactly as if no probe option were present in the connection request. Additionally, when the server sends a connection response packet along the network path towards the client, the response passes through the CP. The CP can thereby implicitly detect that there is no SP on the path towards that particular server and can act accordingly. For example, the CP can just forward traffic or take other actions that do not require a proxy pair, or other actions as described herein.

If there is an SP in the path from the client to the server, then that SP should intercept probe query packets coming from the CP and send a probe response of some form, indicating to the CP its own existence and contact information. In one embodiment, the probe response packet is constructed as a modified connection response packet that corresponds to the modified connection request packet. The CP acts on a response packet by updating the PMT with a new map entry indicating that for the given destination server (and possibly port), there is an SP in the path. The SP contact information is extracted from the probe response and installed in a mapping entry.

If the CP observes a connection response coming from the server without the SP signaling for a connection that the CP signaled towards the server, the CP can conclude that there is no SP in the path. If the CP concludes that a SP is not present, or a previously detected SP is no longer present, the CP updates its PMT with this new information by installing a map entry for the destination server indicating the absence of a proxy.

The mapping entries that are dynamically added to the PMT may become inaccurate over time. For example, a route in the underlying network might change so that the SP on the path for a particular server S may no longer be present on that path. Likewise, a CP could be installed and enabled before its corresponding SP is installed; then, once the SP is installed, the CP will erroneously assume the SP is not present as an entry indicating so is in the PMT. To handle such scenarios, some embodiments of proxy devices occasionally (such as periodically according to a timer) refresh map entries in the PMT.

Process for Performing Auto-Discovery Between Proxy Devices

Figure 4A:
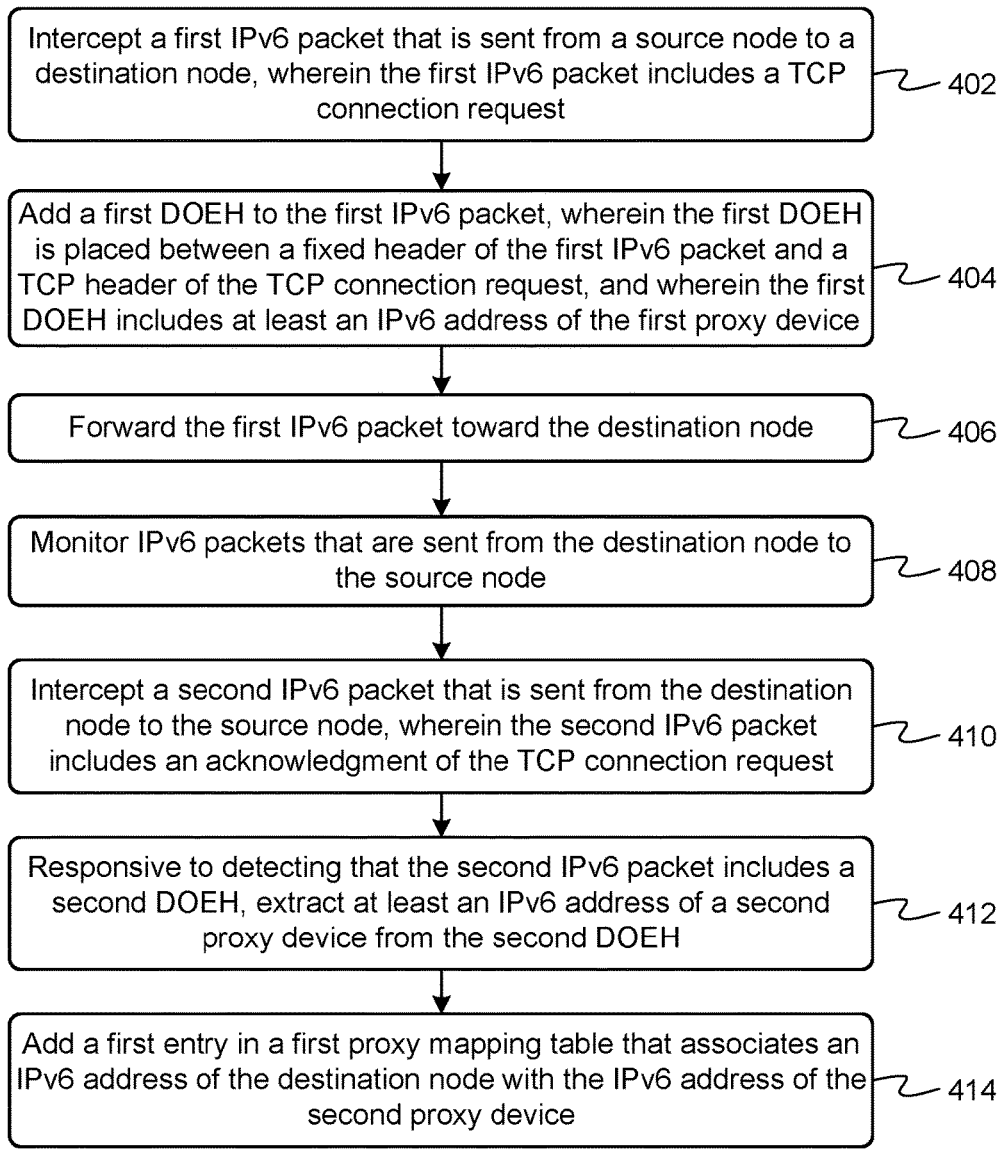
FIGS. 4A and 4B present flowcharts that illustrate processes for performing proxy auto-discovery in an IPv6 network in accordance with some embodiments described herein.
Figure 4B:
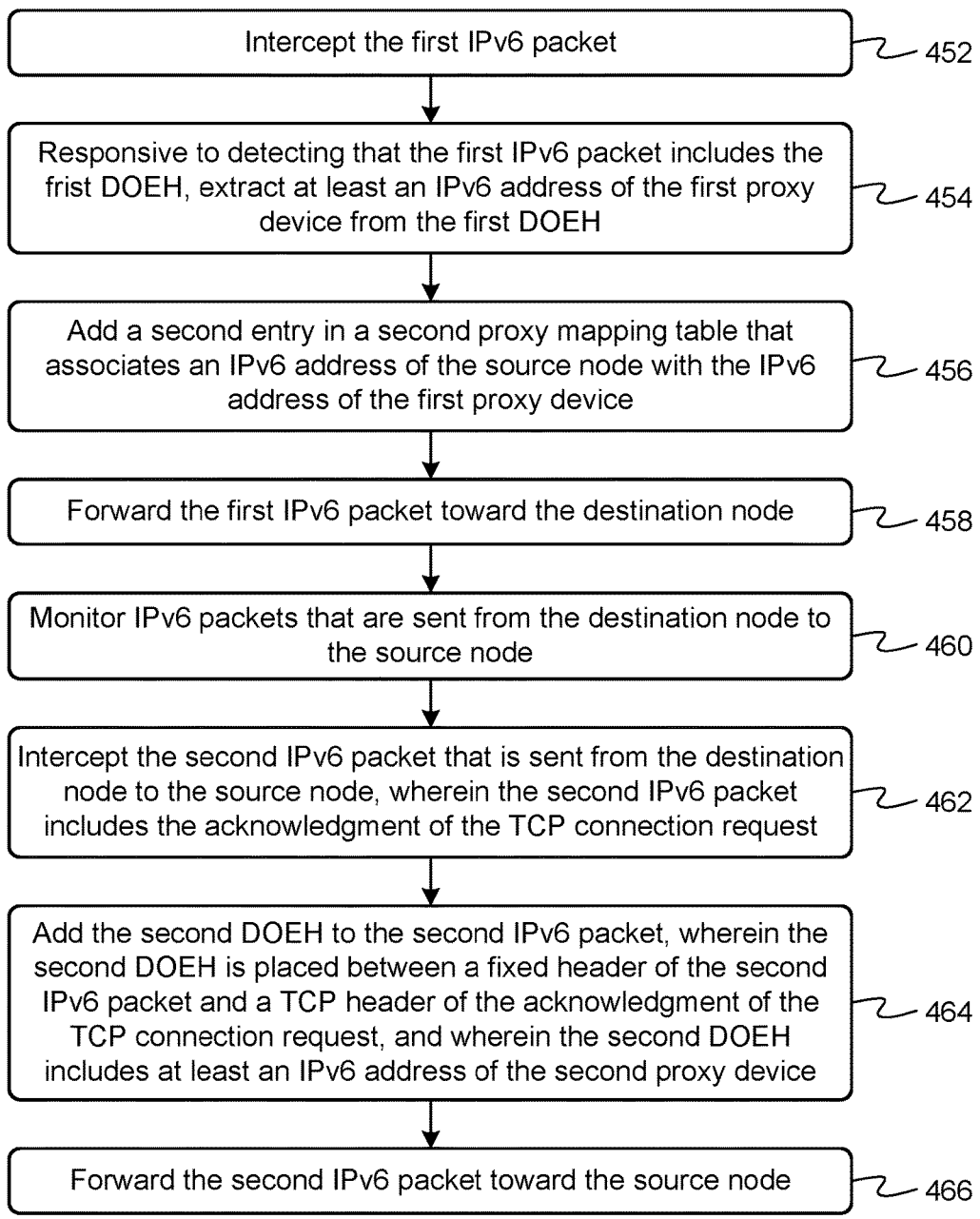

FIGS. 4A and 4B present flowcharts that illustrate processes for performing proxy auto-discovery in an IPv6 network in accordance with some embodiments described herein.

As shown in FIG. 4A, the process can begin by a first proxy device (e.g., proxy device 308 in FIG. 3) intercepting a first IPv6 packet that is sent from a source node (e.g., client 302 in FIG. 3) to a destination node (e.g., server 316 in FIG. 3), wherein the first IPv6 packet includes a TCP connection request, i.e., a TCP SYN packet (step 402). Next, the first proxy device can add a first destination options extension header (DOEH) to the first IPv6 packet, wherein the first DOEH is placed between a fixed header of the first IPv6 packet and a TCP header of the TCP connection request, and wherein the first DOEH includes at least an IPv6 address of the first proxy device (step 404). Specifically, in step 404, the extension headers 204 field can be added to IPv6 packet 200 (see FIG. 2). When the first DOEH is added to the first IPv6 packet, the first proxy device can set a Next Header field in the fixed header of the first IPv6 packet to a first value (e.g., the decimal value 60) that indicates that the first DOEH follows the fixed header. Note that the Next Header field in the first DOEH stores a second value (e.g., the decimal value 6) that indicates that a TCP header follows the first DOEH.

Next, the first proxy device can forward the first IPv6 packet toward the destination node (step 406). The first proxy device can then monitor IPv6 packets that are sent from the destination node to the source node (step 408). Next, the first proxy device can intercept a second IPv6 packet that is sent from the destination node to the source node, wherein the second IPv6 packet includes an acknowledgment of the TCP connection request, i.e., a TCP SYN-ACK packet (step 410). Responsive to detecting that the second IPv6 packet includes a second DOEH, the first proxy device can then extract at least an IPv6 address of a second proxy device from the second DOEH (step 412). Next, the first proxy device can add a first entry in a first proxy mapping table that associates an IPv6 address of the destination node with the IPv6 address of the second proxy device (step 414). The first proxy device can then remove the second DOEH from the second IPv6 packet, and forward the second IPv6 packet toward the source node.

The flowchart shown in FIG. 4B illustrates a process that can occur at the second proxy device. Specifically, the process illustrated in FIG. 4B can begin by the second proxy device intercepting the first IPv6 packet (step 452). Next, responsive to detecting that the first IPv6 packet includes the first DOEH, the second proxy device can extract at least an IPv6 address of the first proxy device from the first DOEH (step 454). The second proxy device can then add a second entry in a second proxy mapping table that associates an IPv6 address of the source node with the IPv6 address of the first proxy device (step 456). Next, the second proxy device can forward the first IPv6 packet toward the destination node (step 458). The second proxy device can then monitor IPv6 packets that are sent from the destination node to the source node (step 460). Next, the second proxy device can intercept the second IPv6 packet that is sent from the destination node to the source node, wherein the second IPv6 packet includes the acknowledgment of the TCP connection request (step 462).

The second proxy device can then add the second DOEH to the second IPv6 packet, wherein the second DOEH is placed between a fixed header of the second IPv6 packet and a TCP header of the acknowledgment of the TCP connection request, and wherein the second DOEH includes at least an IPv6 address of the second proxy device (step 464). When the second DOEH is added to the second IPv6 packet, the second proxy device can set a Next Header field in the fixed header of the second IPv6 packet to the first value that indicates that the second DOEH follows the fixed header. Note that the Next Header field in the second DOEH stores the second value that indicates that a TCP header follows the second DOEH. Next, the second proxy device can forward the second IPv6 packet toward the source node (step 466).

Note that the server will ignore the DOEH if it does not understand the content. Moreover, note that the DOEH is only to be examined by the destination node. Therefore, any intermediate nodes (e.g., routers, switches, etc.) will ignore the DOEH (except, of course, any proxies in the network path that are using the DOEH to perform auto-discovery).

A network path between a client and a server may include more than two proxies. In the following description, the proxy that is nearest to the client on the network path is called the client-side proxy (referred to as the "first proxy" in FIGS. 4A-4B), the proxy that is nearest to the server on the network path is called the server-side proxy (referred to as the "second proxy" in FIGS. 4A-4B), and any other proxies in the network path are called middle proxies. By inspecting the IPv6 packets described in reference to FIGS. 4A-4B, a proxy can determine whether it is a client-side proxy, a server-side proxy, or a middle proxy on the network path. Based on this determination, the proxy can take appropriate steps. For example, the client-side proxy and the server-side proxy can add PMT entries and establish a connection to optimize network traffic along the network path. On the other hand, a middle proxy can merely forward packets between the client and the server without making any changes.

When a proxy receives an IPv6 packet that includes a TCP connection request, but that does not include a DOEH header, then the proxy knows that it is the client-side proxy. Note that all other downstream proxies on the network path from the client to the server will receive the IPv6 packet with the DOEH header that was added by the client-side proxy. The downstream proxies do not add another DOEH to the IPv6 packet; instead the downstream proxies forward the IPv6 packet toward the destination node, and may optionally add an entry to their PMT (alternatively, the downstream proxies may wait for the acknowledgment packet to be returned from the server before deciding to add an entry to their PMT).

Likewise, when a proxy receives an IPv6 packet that includes an acknowledgment of the TCP connection request, but that does not include a DOEH header, then the proxy knows that it is the server-side proxy. Note that all downstream proxies on the network path from the server to the client will receive the IPv6 packet with the DOEH header that was added by the server-side proxy. The downstream proxies do not add another DOEH to the IPv6 packet; instead the downstream proxies forward the IPv6 packet toward the source node. Further details of how client-side and server-side proxies can identify themselves can be found in U.S. Pat. No. 8,180,902.

Figure 5:
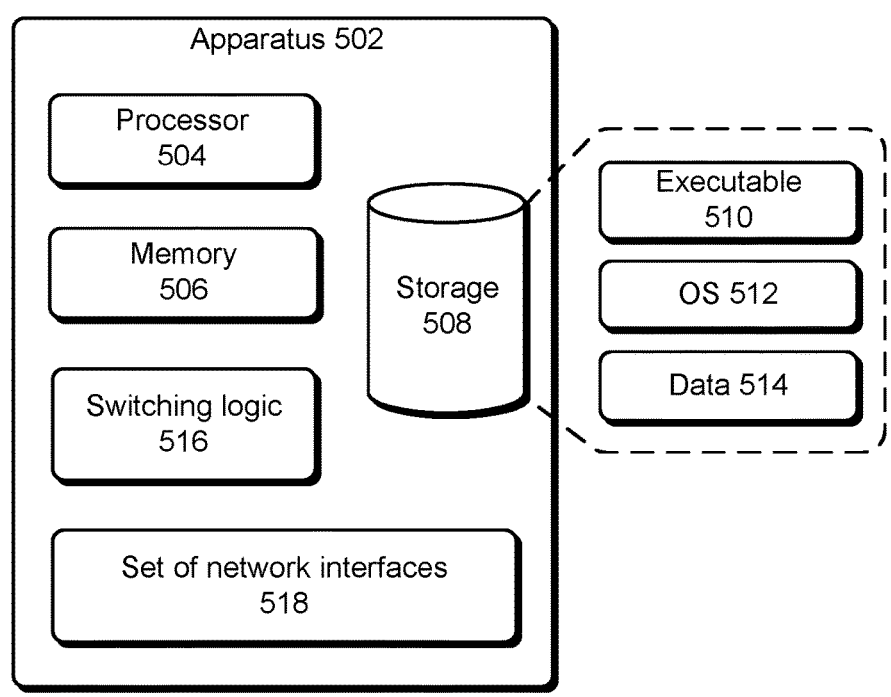
FIG. 5 illustrates an apparatus in accordance with some embodiments described herein.

FIG. 5 illustrates an apparatus in accordance with some embodiments described herein. Apparatus 502 (which can be a proxy device) comprises processor 504, memory 506 (e.g., a volatile or non-volatile random access memory), and storage 508 (e.g., a flash memory device or a disk drive). Storage 508 can store executable 510, operating system 512, and data 514. Apparatus 502 also includes switching logic 516 and set of network interfaces 518. The components in apparatus 502 can communicate with one another using a communication mechanism, e.g., a bus, a backplane, and/or a switching fabric.

Executable 510 can include instructions that, when executed by processor 504, cause apparatus 502 to perform one or more methods that are implicitly or explicitly described in this disclosure. Data 514 can include any data that is inputted into or outputted by executable 510. Set of network interfaces 518 can be used to transmit data to and/or receive data from other communication devices. Switching logic 516 can forward network traffic received on one or more network interfaces in accordance with switching/forwarding/routing information stored in apparatus 502. Specifically, in some embodiments, switching logic 516 can be configured by processor 504 to perform one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for proxy auto-discovery in an Internet Protocol version 6 (IPv6) network, the method comprising:
   a first proxy device intercepting a first IPv6 packet that is sent from a source node to a destination node, wherein the first IPv6 packet includes a Transmission Control Protocol (TCP) connection request;
   the first proxy device adding a first destination options extension header (DOEH) to the first IPv6 packet, wherein the first DOEH is placed between a first fixed header of the first IPv6 packet and a first TCP header of the TCP connection request, and wherein the first DOEH includes at least a first IPv6 address of the first proxy device;
   the first proxy device forwarding the first IPv6 packet toward the destination node;
   the first proxy device monitoring IPv6 packets that are sent from the destination node to the source node;
   the first proxy device intercepting a second IPv6 packet that is sent from the destination node to the source node, wherein the second IPv6 packet includes an acknowledgment of the TCP connection request;
   responsive to detecting that the second IPv6 packet includes a second DOEH, the first proxy device extracting at least a second IPv6 address of a second proxy device from the second DOEH; and
   the first proxy device adding a first entry in a first proxy mapping table that associates a destination IPv6 address of the destination node with the second IPv6 address of the second proxy device.

2. The method of claim 1, further comprising setting a first Next Header field in the first fixed header of the first IPv6 packet to a first value that indicates that the first DOEH follows the first fixed header.

3. The method of claim 2, wherein a second Next Header field in the first DOEH stores a second value that indicates that the first TCP header follows the first DOEH.

4. The method of claim 1, further comprising the first proxy device removing the second DOEH from the second IPv6 packet.

5. The method of claim 4, further comprising the first proxy device forwarding the second IPv6 packet toward the source node.

6. The method of claim 1, further comprising:
   the second proxy device intercepting the first IPv6 packet;
   responsive to detecting that the first IPv6 packet includes the first DOEH, the second proxy device extracting at least the first IPv6 address of the first proxy device from the first DOEH;
   the second proxy device adding a second entry in a second proxy mapping table that associates a source IPv6 address of the source node with the first IPv6 address of the first proxy device;
   the second proxy device forwarding the first IPv6 packet toward the destination node;
   the second proxy device monitoring IPv6 packets that are sent from the destination node to the source node;
   the second proxy device intercepting the second IPv6 packet that is sent from the destination node to the source node, wherein the second IPv6 packet includes the acknowledgment of the TCP connection request;
   the second proxy device adding the second DOEH to the second IPv6 packet, wherein the second DOEH is placed between a second fixed header of the second IPv6 packet and a second TCP header of the acknowledgment of the TCP connection request, and wherein the second DOEH includes at least the second IPv6 address of the second proxy device; and
   the second proxy device forwarding the second IPv6 packet toward the source node.

7. A non-transitory computer-readable storage medium storing instructions that, when executed by a first proxy device, cause the first proxy device to perform a method for proxy auto-discovery in an Internet Protocol version 6 (IPv6) network, the method comprising:

intercepting a first IPv6 packet that is sent from a source node to a destination node, wherein the first IPv6 packet includes a Transmission Control Protocol (TCP) connection request;

adding a first destination options extension header (DOEH) to the first IPv6 packet, wherein the first DOEH is placed between a first fixed header of the first IPv6 packet and a first TCP header of the TCP connection request, and wherein the first DOEH includes at least a first IPv6 address of the first proxy device;

forwarding the first IPv6 packet toward the destination node;

monitoring IPv6 packets that are sent from the destination node to the source node;

intercepting a second IPv6 packet that is sent from the destination node to the source node, wherein the second IPv6 packet includes an acknowledgment of the TCP connection request;

responsive to detecting that the second IPv6 packet includes a second DOEH, extracting at least a second IPv6 address of a second proxy device from the second DOEH; and adding a first entry in a first proxy mapping table that associates a destination IPv6 address of the destination node with the second IPv6 address of the second proxy device.

8. The non-transitory computer-readable storage medium of claim 7, wherein the method further comprises setting a first Next Header field in the first fixed header of the first IPv6 packet to a first value that indicates that the first DOEH follows the first fixed header.

9. The non-transitory computer-readable storage medium of claim 8, wherein a second Next Header field in the first DOEH stores a second value that indicates that the first TCP header follows the first DOEH.

10. The non-transitory computer-readable storage medium of claim 7, wherein the method further comprises removing the second DOEH from the second IPv6 packet.

11. The non-transitory computer-readable storage medium of claim 10, wherein the method further comprises forwarding the second IPv6 packet toward the source node.

12. A first proxy device, comprising:

a processor; and a non-transitory computer-readable storage medium storing instructions that, when executed by the processor, cause the first proxy device to perform a method for proxy auto-discovery in an Internet Protocol version 6 (IPv6) network, the method comprising:

intercepting a first IPv6 packet that is sent from a source node to a destination node, wherein the first IPv6 packet includes a Transmission Control Protocol (TCP) connection request;

adding a first destination options extension header (DOEH) to the first IPv6 packet, wherein the first DOEH is placed between a first fixed header of the first IPv6 packet and a first TCP header of the TCP connection request, and wherein the first DOEH includes at least a first IPv6 address of the first proxy device;

forwarding the first IPv6 packet toward the destination node;

monitoring IPv6 packets that are sent from the destination node to the source node;

intercepting a second IPv6 packet that is sent from the destination node to the source node, wherein the second IPv6 packet includes an acknowledgment of the TCP connection request;

responsive to detecting that the second IPv6 packet includes a second DOEH, extracting at least a second IPv6 address of a second proxy device from the second DOEH; and adding a first entry in a first proxy mapping table that associates a destination IPv6 address of the destination node with the second IPv6 address of the second proxy device.

13. The first proxy device of claim 12, wherein the method further comprises setting a first Next Header field in the first fixed header of the first IPv6 packet to a first value that indicates that the first DOEH follows the first fixed header.

14. The first proxy device of claim 13, wherein a second Next Header field in the first DOEH stores a second value that indicates that the first TCP header follows the first DOEH.

15. The first proxy device of claim 12, wherein the method further comprises removing the second DOEH from the second IPv6 packet.

16. The first proxy device of claim 15, wherein the method further comprises forwarding the second IPv6 packet toward the source node.

\* \* \* \* \*